Figure 3:
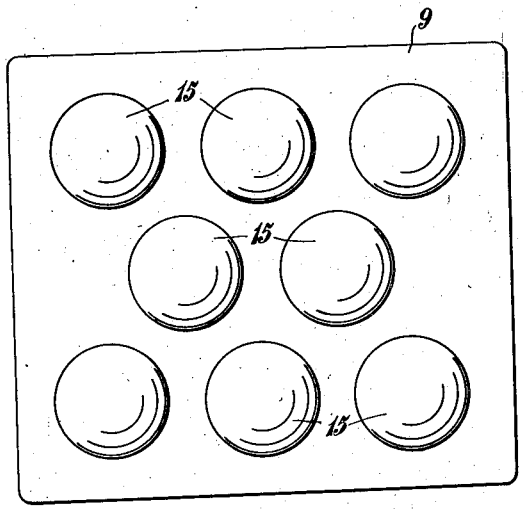

May 25, 1937.  J. A. TALALAY  2,081,777
MANUFACTURE OF HOLLOW RUBBER ARTICLES
Filed Dec. 16, 1935  2 Sheets-Sheet 1
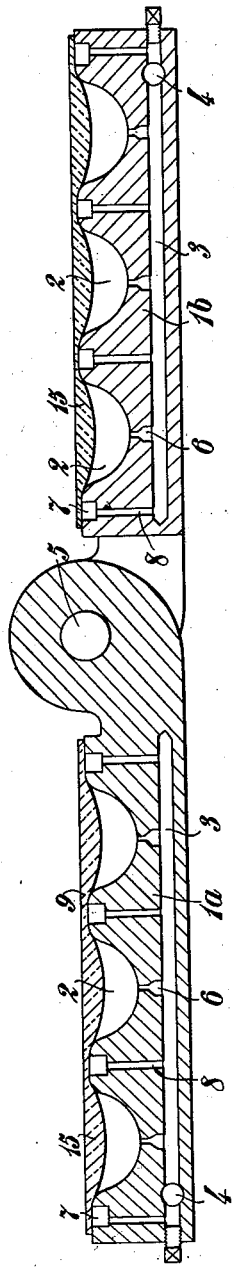
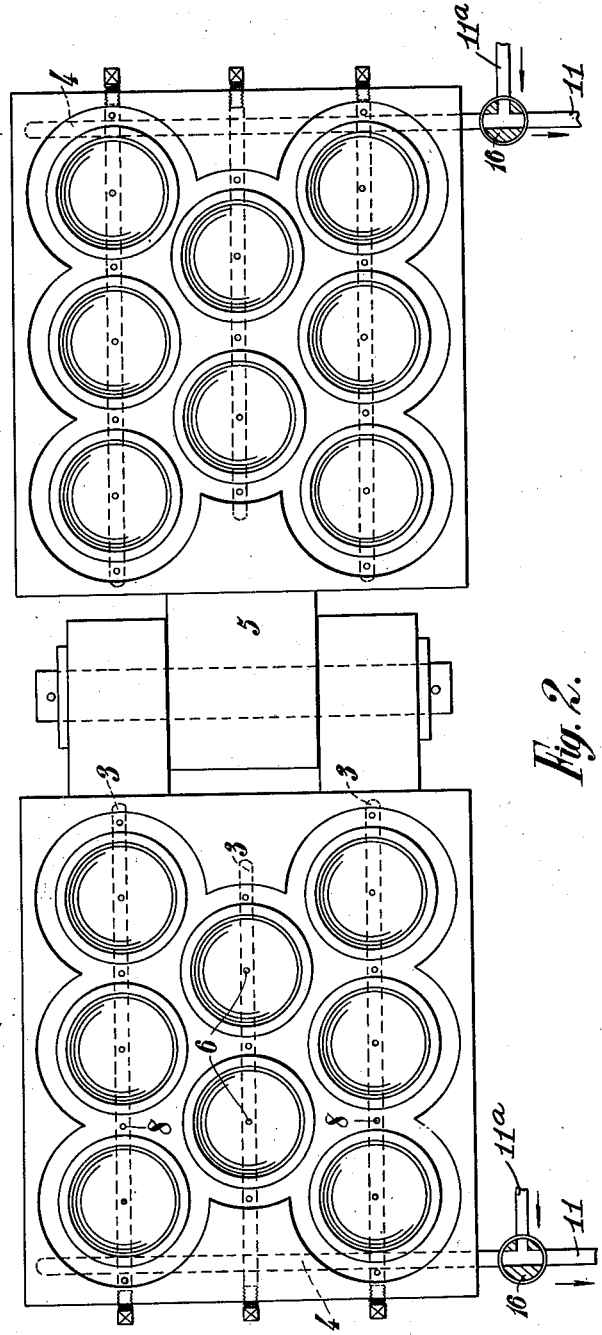
J. A. Talalay
INVENTOR
By: Glascock Downing Seebold
ATYS.

May 25, 1937.  J. A. TALALAY  2,081,777

MANUFACTURE OF HOLLOW RUBBER ARTICLES

Filed Dec. 16, 1935  2 Sheets-Sheet 2

J. A. Talalay
INVENTOR

By: Glascock Downing & Seebold
Attys.

Patented May 25, 1937

2,081,777

UNITED STATES PATENT OFFICE 2,081,777

MANUFACTURE OF HOLLOW RUBBER ARTICLES

Josef Anton Talalay, Bedford, England

Application December 16, 1935, Serial No. 54,715
In Great Britain January 10, 1934

3 Claims. (Cl. 18—56)

This invention relates to the manufacture of hollow rubber articles such as balls, bulbs, dolls, surgical lines or other similar articles from sheet stock under the action of suction or pressure or suction and pressure and the main object of the invention is to produce such articles of a better quality and at a lower cost than hitherto.

It has been proposed to produce hollow rubber articles from raw unvulcanized stock in molds, suction or pressure or suction and pressure being employed in carrying out the process. In the case where suction is employed, a plain unvulcanized sheet of rubber is placed over a mold having cavities therein corresponding approximately to the shape of one half of the articles to be formed and the rubber is sucked into the cavities by evacuating the latter, the shaped rubber sheet taking the shape of one half of the article required. The other halves of the articles are formed in the same way and the two parts of the mold are placed together face to face and pressure is applied, uniting the edges of the two halves. The articles are then properly trimmed and vulcanized in molds in the ordinary way. In the case where the process is carried out with the use of pressure, the two halves of the article required are molded between a core piece and a cavity or matrix. The core piece is then removed, the subsequent procedure being as above-mentioned.

It has been found that articles produced by either of the above-described methods have a distinct defect inasmuch as the thickness of the wall of the article varies continuously from a maximum at the part which has been shaped by the edges of the cavity to a minimum at the part which has been shaped by the bottom of the cavity and it is not possible for instance to produce satisfactory balls of comparatively large diameter in either of these ways.

It has also been proposed to cover golf or like balls with plastic material such as balata, to produce covers of uniform thickness throughout, the plastic material being applied under pressure in the form of sheets to each half of the ball in succession by means of molds having cavities adapted to accommodate one half of the ball and the covering layer, the sheets of plastic material previously to being applied to the balls being passed between rolls so as to produce mounds on the sheets at the points where plastic material comes opposite the mold cavities. Such a method is unsuitable for the production of hollow rubber articles.

It has also been proposed in the manufacture of hollow articles by forcing plastic stock into molds by vacuum while the edges of the stock are retained at the rims of the cavities, to compensate for the stretching effect produced on the rubber stock under the action of the vacuum and rendering the walls of the articles thinner in the base of the cavity, by providing an extra thickness of the raw rubber stock for such portions of the article.

The mere provision of an extra thickness of the stock for the portions of the article in question is insufficient to ensure the production of hollow rubber bodies having walls of uniform thickness, for which purpose it has been found necessary to vary the thickness of the stock sheet continuously according to the depth of the different parts of the cavity. The present invention accordingly consists in a process for manufacturing hollow rubber articles having walls of uniform thickness and, therefore, of uniform elasticity and having lasting properties by making use of a stock sheet of non-uniform thickness, the parts of which corresponding to the cavities being of greater thickness than the parts thereof corresponding to the raised portions of the molds, the thickness varying continuously according to the varying depth of the cavity, being a maximum at the point corresponding to the deepest part of the cavity.

Figure 4:
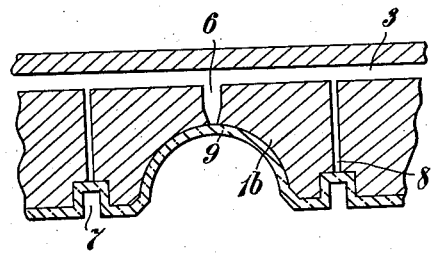
Figure 5:
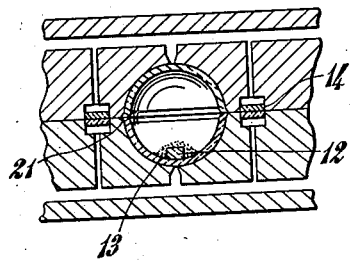

The invention is illustrated by way of example in the accompanying drawings in which:

Figure 1 is a sectional elevation showing the profiled raw stock sheet covering the mold cavities before the vacuum has been applied, Figure 2 is a top plan view of the mold members not covered by the sheet, Figure 3 is a top plan view of the profiled rubber sheet, Figure 4 is a sectional elevation showing a part of the sheet of stock sucked into a cavity, Figure 5 is a view similar to Figure 4, with the exception that the mold members are brought together in such a way as to complete the formation of the articles and to sever the trimmings.

It is to be understood that the apparatus shown in the drawings is only by way of example and that the process is not limited to any particular form of apparatus. It is also to be understood that the suction action may be assisted or replaced by the pressure action of solid, liquid or gaseous matter during the molding or vulcanizing of the articles.

Referring to Figures 1 and 2 of the drawings, *1a* and *1b* are two parts of a mold having a plurality of cavities and connected together by hinges 5. This is however but one way of putting the invention into practice because the two parts of the mold may be moved backwards and forwards or up and down with respect to one another by any usual or preferred means. The parts of the mold are provided with cavities or sockets 2 which correspond approximately to the shape of one half of the article to be formed. The parts 15 of the sheet of rubber stock corresponding to the cavities of the mold are of greater thickness than the parts thereof corresponding to the raised portions of the mold, the thickness of the parts of the stock sheet corresponding to the cavities varying according to the depth of the cavities. The thickness of the parts of the stock sheet corresponding to each cavity also varies according to the varying depth of the cavity. In Figures 1 and 2 it is assumed that the articles to be produced are balls and the thickened parts are of plano-convex section but the section could equally well be bi-convex.

The cavities 2 are connected by ducts 6 to a system of ducts 3 which lead to a duct 4 which in its turn is connected through a three-way cock 16 connected with a vacuum pump or vessel on one side and a compressed air conduit on the other.

The cavities 2 are surrounded by channels 7 which through bores 8 communicate either to the same or to a separate vacuum and pressure piping system.

In carrying the invention into effect a suitably profiled rubber sheet is produced either by calendering between engraved rolls or by pressing plain raw stock between profiled or engraved metal sheets or by gelatinating latex mixtures on or between such metal sheets or in any other suitable or preferred way. The shape of the profiles on the stock sheet varies according to the shape of the article required.

The raw stock may be built up from a plurality of layers of sheet rubber superposed in such a manner that the directions of rolling of the several layers cross one another or the profiled sheet may be made from a plurality of plain rubber sheets superposed in this manner and formed into a single sheet during the profiling.

A warm profiled stock sheet 9 is put with its thickened portions 15 on each member of the mold 1a and 1b whereupon the cavities 2 and the channels 7 are evacuated through conduits 11, 4, 3 and 6 or 8 respectively, three-way valves 16 being provided for enabling the conduits 4 to be placed alternately into communication through the conduit 11 with a vacuum pump or through the conduit 11a with the atmosphere. The plastic stock is thus sucked into the cavities 2 and the channels 7. The stock will reach the bottom of the channels 7 first. It adheres there, preventing any later displacement of the sheet. If a separate system is used for evacuating the channels 7 and the cavities 2 vacuum can be first applied to the channels 7 and only after this to the cavities 2.

Now one half of the ball can be provided with the customary rubber block 12 to provide for proper inflation of the ball after vulcanizing. This step need not be referred to in detail because it is customary in the manufacture of hollow rubber articles.

Before joining the halves some blowing matter can be placed in each of the lower halves of the balls so that when the balls are transferred to the vulcanizing mold, heated gases will be produced which will force the stock firmly against the surfaces of the mold cavities in the vulcanizing mold (not shown). This step also is common practice and is not claimed.

After gas-forming materials have been introduced into the balls and the stock protruding over the edges of the cavities has, if so preferred, been coated with rubber cement, the two members of the mold 1a and 1b are brought together under pressure. Union is effected between the two halves and the edges are severed and trimmed forming a bead 21 adjoining the article and waste stock 14 in the channels 7.

After air has been admitted to the piping system, the molds are opened, the articles transferred to a vulcanizing mold and the subsequent customary course of proceedings is followed. The removal of the waste stock 14 remaining in the channels 7 is facilitated by blowing compressed air from the pipes 8.

While in the examples described the articles are produced with the use of suction only without cores, it is obvious that cores may be employed where desirable and that pressure alone or pressure and suction may be employed in carrying out the process.

Having now described my invention, what I claim as new and desire to secure by Letters Patent is:—

1. A process for molding hollow rubber articles with walls of uniform thickness, consisting in profiling a sheet of raw unvulcanized rubber stock so as to produce a sheet of non-uniform thickness having at least one part adapted to be forced into a mold cavity and the thickness of said part varying according to the varying depth of the mold cavity and reaching a maximum at the point corresponding to the deepest part of the cavity, forcing the said part of the profiled sheet into the mold cavity under pressure and vulcanizing the molded rubber.

2. A process for molding hollow rubber articles with walls of uniform thickness, consisting in profiling a sheet of raw unvulcanized rubber stock so as to produce a sheet of non-uniform thickness having at least one part adapted to be forced into a mold cavity and the thickness of said part varying according to the varying depth of the mold cavity and reaching a maximum at the point corresponding to the deepest part of the cavity, forcing the said part of the profiled sheet into the mould cavity under fluid pressure produced by evacuating the mold and vulcanizing the molded rubber.

3. A process for molding hollow rubber articles with walls of uniform thickness, consisting in profiling a sheet of raw unvulcanized rubber stock so as to produce a sheet of non-uniform thickness having at least one part adapted to be forced into a mold cavity and the thickness of said part being greater than that of the remainder of the profiled sheet and varying according to the varying depth of the mold cavity and reaching a maximum at the point corresponding to the deepest part of the cavity, forcing the said part of the profiled sheet into the mold cavity under pressure and vulcanizing the molded rubber.

JOSEF ANTON TALALAY.